United States Patent
Welton et al.

(10) Patent No.: US 7,413,013 B2
(45) Date of Patent: Aug. 19, 2008

(54) SURFACTANT-BASED FLUID LOSS CONTROL AGENTS FOR SURFACTANT GELS AND ASSOCIATED FLUIDS AND METHODS

(75) Inventors: Thomas D. Welton, Duncan, OK (US); David E. McMechan, Duncan, OK (US); Jason E. Bryant, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 47 days.

(21) Appl. No.: 11/541,085

(22) Filed: Sep. 29, 2006

(65) Prior Publication Data

US 2008/0078546 A1 Apr. 3, 2008

(51) Int. Cl.
*E21B 43/04* (2006.01)
*E21B 43/22* (2006.01)
*E21B 43/26* (2006.01)

(52) U.S. Cl. .............. 166/279; 166/278; 166/282; 166/283; 166/307; 166/308.2

(58) Field of Classification Search ............. None
See application file for complete search history.

(56) References Cited

U.S. PATENT DOCUMENTS

| | | | |
|---|---|---|---|
| 5,301,751 A | 4/1994 | Githens et al. ........... 166/283 |
| 6,767,869 B2 | 7/2004 | DiLullo et al. ........... 507/244 |
| 2002/0169085 A1* | 11/2002 | Miller et al. ........... 507/200 |
| 2005/0124525 A1 | 6/2005 | Hartshorene et al. ..... 510/424 |
| 2006/0180308 A1 | 8/2006 | Welton et al. ........... 166/282 |
| 2006/0180309 A1 | 8/2006 | Welton et al. ........... 166/282 |
| 2006/0180310 A1 | 8/2006 | Welton et al. ........... 166/283 |
| 2006/0183646 A1 | 8/2006 | Welton et al. ........... 507/259 |

FOREIGN PATENT DOCUMENTS

WO  WO 02/084075 A1  10/2002

OTHER PUBLICATIONS

International Search Report and Written Opinion for Application No. PCT/GB2007003628, Sep. 25, 2007.

* cited by examiner

Primary Examiner—Zakiya W. Bates
(74) Attorney, Agent, or Firm—Robert A. Kent; Baker Botts LLP

(57) ABSTRACT

Of the many methods provided, in one aspect, the present invention provides a method comprising: providing a treatment fluid comprising: an aqueous base fluid, a first surfactant, and a surfactant-based fluid loss control agent capable of forming a viscoelastic fluid; and introducing the treatment fluid into a well bore that penetrates the subterranean formation.

22 Claims, 1 Drawing Sheet

Figure 1:
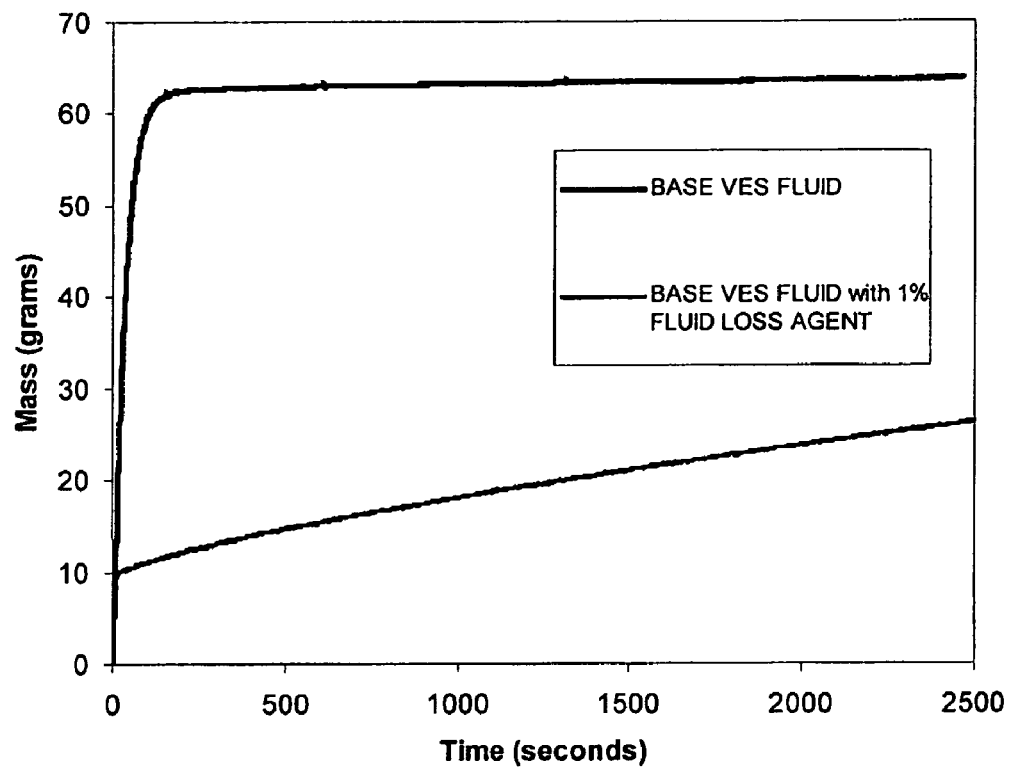

SURFACTANT-BASED FLUID LOSS CONTROL AGENTS FOR SURFACTANT GELS AND ASSOCIATED FLUIDS AND METHODS

BACKGROUND

The present invention relates to methods and compositions for treating subterranean formations. More particularly, the present invention relates to surfactant-based fluid loss control agents for surfactant gels, and associated methods.

Viscosified treatment fluids may be used in a variety of subterranean treatments. Such treatments include, but are not limited to, drilling operations, stimulation treatments, and sand control treatments; As used herein, the term "treatment," or "treating," refers to any subterranean operation that uses a fluid in conjunction with a desired function and/or for a desired purpose. The term "treatment," or "treating," does not imply any particular action by the fluid.

Drilling operations typically require the use of a drilling fluid. During drilling operations, a viscosified treatment fluid (e.g., a drilling fluid) passes down through the inside of the drill string, exits through the drill bit, and returns to the drilling rig through the annulus between the drill string and well bore. The circulating drilling fluid, among other things, lubricates the drill bit, transports drill cuttings to the surface, and balances the formation pressure exerted on the well bore. Drilling fluids typically require sufficient viscosity to suspend drill cuttings. Viscosified treatment fluids also may be used in, other operations to transport and remove formation particulates from the well bore or the near well bore region. In some instances, these formation particulates may be generated during the course of drilling, digging, blasting, dredging, tunneling, and the like in the subterranean formation.

One common production stimulation operation that employs a viscosified treatment fluid is hydraulic fracturing. Hydraulic fracturing operations generally involve pumping a viscosified treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the viscosity of the fracturing fluid usually is reduced, and the fracturing fluid may be recovered from the formation.

Treatment fluids are also utilized in sand control treatments, such as gravel packing. In gravel-packing treatments, the viscosified treatment fluid suspends particulates (commonly referred to as "gravel particulates") for delivery to a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. In some situations, fracturing and gravel-packing treatments are combined into a single treatment (commonly referred to as "frac pack" operations) to provide stimulated production and an annular gravel pack to reduce formation sand production. In some cases, the treatments are completed with a gravel pack screen assembly in place, and the fracturing treatment fluid being pumped through the annular space between the casing and screen. In such a situation, the fracturing treatment usually ends in a screen-out condition, creating an annular gravel pack between the screen and casing. This allows both the fracturing treatment and gravel pack to be placed in a single operation.

Maintaining sufficient viscosity in these fluids is important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport as well as to create or enhance fracture width. Particulate transport is also important in sand control treatments, such as gravel packing. Also, maintaining sufficient viscosity may be important to control and/or reduce leak-off into the formation. To provide the desired viscosity, polymeric gelling agents commonly are added to the treatment fluids. Examples of commonly used polymeric gelling agents include, but are not limited to, guar gums and derivatives thereof, cellulose derivatives, biopolymers, and the like. The use of polymeric gelling agents, however, may be problematic. For instance, these polymeric gelling agents may leave an undesirable residue in the subterranean formation after use. As a result, potentially costly remedial operations may be required to clean up the fracture face and proppant pack. Foamed treatment fluids and emulsion-based treatment fluids have been employed to minimize residual damage, but increased expense and complexity often result.

To combat these and other problems associated with polymeric gelling agents, some liquid surfactants have been used as gelling agents. Certain surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein. As a result, these treatment fluids exhibiting viscoelastic behavior may be used in a variety of subterranean treatments where a viscosified treatment fluid may be useful. Such viscosified fluids may be referred to herein as "surfactant gels." No particular structure or composition is implied by the term. Surfactant gels generally are thought to be non-damaging to the subterranean formation in which they are used because they do not leave an undesirable polymer residue.

Although such fluids may be used in downhole applications, oftentimes surfactant gels may experience significant fluid loss complications. This may be because they do not build a filter cake as a more traditional viscosified treatment fluid that comprises a polymeric gelling agent does. More fluid is lost as a result. This problem may be worse at higher temperatures. Moreover, adding a gelling agent polymer to the surfactant gel to combat this fluid loss problem is generally not desirable because it defeats the purpose of using a surfactant gel. Additionally, any formation fluids that may be present in the subterranean formation (e.g., hydrocarbons, additives, solvents, corrosion inhibitors, etc.) may reduce the viscosity of the surfactant gel, which increases fluid loss.

Conventional attempts to combat such fluid loss problems have not met with much success. One method is to do nothing, and just pump a significantly larger fluid volume at higher rates to combat the fluid loss. However, as known by those skilled in the art, this is not an optimal method for treating with surfactant gels. Another method includes pumping a pad or a pre-pad fluid that contains a polymeric gelling agent before or with the surfactant gel. This method, however, is undesirable because it defeats one of the purposes of using a surfactant gel, i.e., using a non-polymeric containing fluid. Another method is to foam the surfactant gel with a gas or with the use of an expanding additive. Such methods can be logistically difficult to manage, however, especially in offshore or remote well locations. Moreover, the pumping rate at which the foamed fluid may be pumped is limited. Yet another method to combat fluid loss control in surfactant gels includes adding a fluid loss control agent. Common fluid loss control agents include silica, mica, and calcite, alone, in combination, or in combination with starch. Use of these fluid loss control additives alone in surfactant gels, however, has been observed to give only modest decreases in fluid loss. The poor performance of these conventional fluid loss additives is typically attributed to the period of high leak-off (spurt) before a filter cake is formed and the formation of a filter cake permeable to the surfactant gel. Additionally, the silica flour may remain in the formation, which is damaging to the formation, and therefore, undesirable. Polylactic acid fluid loss control agents generally have temperature limitations at the lower temperatures. Additionally, many traditional attempts to control fluid loss in surfactant gels are either not temporary or provide no gel stabilization.

SUMMARY

The present invention relates to methods and compositions for treating subterranean formations. More particularly, the present invention relates to surfactant-based fluid loss control agents for surfactant gels, and associated methods.

In one embodiment, the present invention provides a method comprising: providing a treatment fluid comprising: an aqueous base fluid, a first surfactant, and a surfactant-based fluid loss control agent capable of forming a viscoelastic fluid; and introducing the treatment fluid into a well bore that penetrates the subterranean formation.

In another embodiment, the present invention provides a method of providing fluid loss to a surfactant gel comprising adding a surfactant-based fluid loss control agent capable of forming a viscoelastic fluid to the surfactant gel.

In another embodiment, the present invention provides a method of fracturing a subterranean formation comprising: providing a treatment fluid, the treatment fluid comprising: an aqueous base fluid; a first surfactant; and a surfactant-based fluid loss control agent capable of forming a viscoelastic fluid; and introducing the treatment fluid into a well bore that penetrates the subterranean formation at or above a pressure sufficient to create or enhance one or more fractures in a portion of the subterranean formation.

In another embodiment, the present invention provides a method comprising: providing a treatment fluid that comprises an aqueous base fluid, particulates, a first surfactant, and a surfactant-based fluid loss control agent capable of forming a viscoelastic fluid; introducing the treatment fluid into a well bore that penetrates a subterranean formation such that the particulates form a gravel pack in or adjacent to a portion of the subterranean formation.

The features and advantages of the present invention will be readily apparent to those skilled in the art upon a reading of the description of the preferred embodiments that follows.

DRAWINGS

A more complete understanding of the present disclosure and advantages thereof may be acquired by referring to the following description taken in conjunction with the accompanying drawings, wherein:

FIG. 1 is a graph illustrating data discussed in the examples.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to methods and compositions for treating subterranean formations. More particularly, the present invention relates to surfactant-based fluid loss control agents for surfactant gels, and associated methods. The present invention also provides treatment fluids that comprise these surfactant-based fluid loss control agents, and these fluids may be used in a variety of subterranean applications including, but not limited to, fracturing, acidizing (matrix or fracture), gravel packing, drilling, plugging, and as a fluid loss pills.

Among the many benefits presented by the present invention, the surfactant-based fluid loss control agents of the present invention provide an advantageous means of controlling fluid loss in surfactant gels. Moreover, in some embodiments, if the surfactant-based fluid loss control agents are present in a sufficient concentration, the surfactant-based fluid loss control agents may viscosify the treatment fluid as well as providing fluid loss control for the treatment fluid. In that way, in some embodiments, a viscoelastic surfactant gel may be provided that minimizes fluid loss using the same surfactant.

The surfactant-based fluid loss control agents of the present invention comprise a powdered or solid viscoelastic gel forming surfactant such as but not limited to methyl ester sulfonates ("MES"), sarcosinates, taurates, behenyl quats or derivatives and combinations thereof. These may be used in salt form if desired. MES-based fluid loss control agents are preferred. Another suitable surfactant is behenyl trimethyl ammonium chloride. Behenyl trimethyl ammonium chloride may be especially useful in acidizing applications. In some embodiments, while a significant portion of the powdered surfactants hydrates quickly in water to form a viscoelastic gel, a portion of it requires time or temperature to be hydrated. In some embodiments, the remaining solid is thought to act as a temporary fluid loss control agent for an ensuing treatment.

In some embodiments, the treatment fluids of the present invention comprise a viscoelastic surfactant, an aqueous base fluid, and a surfactant-based fluid loss control agent of the present invention. A salt may be included if desired. The surfactant-based fluid loss control agent may be a dry, solid, or slurried surfactant capable of forming a viscoelastic fluid, and in alternative embodiments, may be present in an amount up to the amount needed to sufficiently viscosify the aqueous base fluid for a given application, if desired. These treatments fluids may be considered surfactant gels, as that term is used herein. In some instances, the treatment fluids of the present invention may exhibit viscoelastic behavior which may be due, at least in part, to the association of at least a portion of the viscoelastic surfactant into a plurality of micellar associations. Additionally, other additives suitable for use in the particular application may be included in the treatment fluids of the present invention as recognized by one of ordinary skill in the art having the benefit of this disclosure. If used in a sufficient concentration, these surfactant-based fluid loss control agents may viscosify a treatment fluid to the same extent as other viscoelastic surfactants, and thus, in some embodiments may be used without a viscoelastic surfactant. Thus, in such embodiments, it may be possible to mitigate fluid loss in a surfactant gel with the surfactant that viscosifies the fluid.

The surfactant can be added to an aqueous base fluid in which there may be at least one water soluble salt dissolved therein to effect formation stability. Typical water-soluble salts include potassium chloride, sodium chloride and the like. Formation stability is typically achieved with only small concentrations of salt. The water-soluble salts may be considered part of the "buffer" for adjusting the pH of the combined aqueous base fluid and surfactant in the methods of the present invention. The viscosity of the fluids of the invention may be improved significantly by the addition of at least one anion to the surfactant-laden solution. The pH can be adjusted, for example, by the addition of alkali metal, carbonate, phosphate or borate, or organic amines, especially alkanol amines such as mono-, di- or triethanolamine. Each salt is thought to produce a peak viscosity at a different pH.

The temperature stability of the treatment fluids of the present invention may be enhanced by selecting specific anions, such as phosphate or fluoride ions instead of chlorides, preferably provided in the form of an inorganic phosphate or fluoride salt or a fluoride acid such as fluorosilicic acid ($H_2SiF_6$). The fluoride salt concentration can be about 0.5% to about 10% by weight, and more preferably about 3% to about 7% by weight, based upon the total weight of the fluid. Typical fluoride salts include ammonium bifluoride and potassium fluoride. The pH of the surfactant-fluoride salt solution can be adjusted to about 6.5 to about 10. The pH can be adjusted with the same bases as discussed above.

The sarcosinate surfactants suitable for use as the surfactant-based fluid loss control agents of the present invention may be mild, biodegradable anionic surfactants, generally derived from fatty acids and sarcosine (an amino acid). Suitable sarcosinate surfactants include alkyl sarcosinates. The alkyl sarcosinates can generally have any number of carbon atoms; preferred alkyl sarcosinates may have about 12 to about 24 carbon atoms. The alkyl sarcosinates can have about 14 to about 18 carbon atoms, in some embodiments. Specific examples of the number of carbon atoms include 12, 14, 16, 18, 20, 22, and 24 carbon atoms. Sarcosine (N-methylglycine) is a suitable sarcosinate surfactant for use in the present invention, and is a naturally occurring amino acid found in, for example, starfish, sea urchins and crustaceans. It can be purchased from a variety of commercial sources, or alternately produced by a number of synthetic routes known in the art including thermal decomposition of caffeine in the presence of barium hydroxide and numerous others. Sodium sarcosinate can be manufactured commercially from formaldehyde, sodium cyanide, and methyl amine. Other suitable sarcosinates are the condensation products of sodium sarcosinate and a fatty acid chloride. The fatty acid chloride is reacted with sodium sarcosinate under carefully controlled alkaline conditions (i.e., the Schotten-Bauman reaction) to produce the fatty sarcosinate sodium salt, which is water soluble. Upon acidification, the fatty sarcosine acid, which is also water insoluble, is formed and may be isolated from the reaction medium. The acyl sarcosines may be neutralized with bases such as the salts of sodium, potassium, ammonia, or organic bases such as triethanolamine in order to produce aqueous solutions. The preferred sarcosinates of the invention can be represented structurally as: $R_1CON(R_2)CH_2X$, wherein $R_1$ is a hydrophobic moiety of alkyl, alkenyl, alkylarylalkyl, alkoxyalkyl, and the like, wherein alkyl and alkenyl represent groups that contain about 12 to about 24 carbon atoms which may be branched or straight chained. Representative long chain alkyl groups include, but are not limited to, tetradecyl, hexadecyl, octadecentyl (oleyl), octadecyl (stearyl), and docosenoic functionalities. $R_2$ is hydrogen, methyl, propyl, butyl, or ethyl. X is carboxyl or sulfonyl.

The taurate surfactants suitable for use as the surfactant-based fluid loss control agents of the present invention include water-soluble substituted taurines. Examples include, but are not limited to, N-acyl N-methyl taurates, such as N-cetyl N-methyl taurate, N-erucyl N-methyl taurate, N-oleoyl N-methyl taurate, N-cocoyl N-methyl taurate, N-tallowyl N-methyl taurate, N-tallyl N-methyl taurate, N-soyayl N-methyl taurate and N-rapeseedyl N-methyl taurate or N-acyl taurates, such as N-erucyl taurate, N-oleoyl taurate, N-cocoyl taurate, N-tallowyl taurate, N-tallyl taurate, N-soyayl taurate, and N-rapeseedyl taurate. Combinations and derivatives of these also may be suitable. Other suitable examples are disclosed in U.S. Published Patent Application 2005-0124525, the relevant disclosure of which is hereby incorporated by reference.

The MES surfactants suitable for use as the surfactant-based fluid loss control agents of the present invention may be described by the following formula:

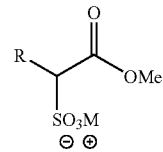

Formula I where R is an alkyl chain of from about 10 carbon atoms to about 30 carbon atoms. In some embodiments, R is an alkyl chain of from about 16 carbon atoms to about 22 carbon atoms. An example of a suitable MES surfactant of Formula I is a palm-oil derivative commercially available from Halliburton Energy Services, Inc., Duncan, Okla., under the trade name "EFS™-4" surfactant. MES surfactants are believed to be relatively environmentally benign, in most instances, because these surfactants are biodegradable in most environments.

The MES surfactants of Formula I are a class of anionic surfactants that have been found to cause fluids to exhibit viscoelastic properties. It is believed that, when the MES surfactant is dissolved in an aqueous environment having a certain ionic strength, the MES surfactant molecules (or ions) may associate to form micellular associations because of their hydrophobic and hydrophilic regions. These micelles may be rod-shaped, worm-shaped, or any of a variety of other shapes that will viscosity a fluid where present in sufficient concentrations. These micelles, among other things, may increase the viscosity of the fluid therein. In the presence of a sufficient amount of hydrocarbons or at a certain ionic strength, these micelles may become unstable, thereby disassociating or forming a micellar structure that is not conducive to viscosifying a fluid. This disassociation and/or modification of the micellar structure leads to a reduction in viscosity for the treatment fluid.

Behenyl (sometimes referred to as eurcyl) quats such as behenyl trimethyl ammonium chloride ("BTAC") is also suitable for use as a surfactant-based fluid loss control agent in accordance with the present invention. BTAC may be used as an active ingredient for conditioners, an antistatic agent, a detergent sanitizer, and a softener. BTAC may be particularly suitable for acidizing applications.

To control fluid loss, the viscoelastic surfactant-based fluid loss control agents should be used in a fluid in an amount of from about 0.01% to about 30% based on the weight of the surfactant gel. In preferred embodiments, the fluid loss agents should be used in a surfactant gel in an amount of from about 0.1% to about 10%.

The aqueous base fluid used in the treatment fluids of the present invention may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability of the treatment fluids of the present invention. In some embodiments, the aqueous base fluid may be acidic.

The surfactants included in the fluids of the present invention may comprise any suitable surfactant that is capable of imparting viscoelastic properties to an aqueous fluid. For some applications, liquid surfactants may be preferred. These surfactants may be cationic, anionic, or amphoteric in nature, and comprise any number of different compounds, including methyl ester sulfonates (as described in U.S. patent application Ser. Nos. 11/058,660, 11/058,475, 11/058,612, and 11/058,611 filed Feb. 15, 2005), betaines, modified betaines, sulfosuccinates, taurates, amine oxides, ethoxylated fatty amines, quaternary ammonium compounds, derivatives thereof, and combinations thereof. The term "derivative" is defined herein as any compound that is made from one of the listed compounds, for example, by replacing one atom in one of the listed compounds with another atom or group of atoms, ionizing one of the listed compounds, or creating a salt of one of the listed compounds. The surfactant should be present in a treatment fluid of the present invention in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.1% to about 20% by volume of the viscoelastic surfactant fluid. In certain embodiments, the surfactant may be present in an amount in the range of from about 2% to about 10% by volume of the viscoelastic surfactant fluid. Another preferred fluid is where the viscoelastic surfactant is added as a dry solid, powder, or slurry in such a concentration that not only is a viscoelastic fluid is formed, but also some of the surfactant remains as solid particulates for fluid loss control.

To provide the ionic strength for the desired micelle formation in the treatment fluids, the treatment fluids of the present invention may comprise a water-soluble salt. Adding a salt may promote micelle formation for the viscosification of the fluid. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocyanate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide. In certain embodiments, the water-soluble salt may be present in the treatment fluids of the present invention in an amount in the range of from about 1% to about 75% bwof. In certain other embodiments such as for some hydraulic fracturing applications, the water-soluble salt may be present in the treatment fluids of the present invention in an amount in the range of from about 1% to about 10% bwof.

In some embodiments, the treatment fluids of the present invention may be foamed or commingled with a gas. This may be through the injection of a gas such as nitrogen or carbon dioxide or through the addition of an expanding additive that generates a gas in the fluid.

The treatment fluids may optionally comprise a co-surfactant, among other things, to facilitate the formation of and/or stabilize a foam, increase salt tolerability, and/or stabilize the treatment fluid. The co-surfactant may comprise any surfactant suitable for use in subterranean environments that does not adversely affect the treatment fluid. Examples of suitable co-surfactants include betaines (e.g., cocobetaine, cocoamidopropylbetaine), amine oxides, derivatives thereof, and combinations thereof. One of ordinary skill in the art will be able to determine which co-surfactants are best suited to the particular embodiments and applications of the compositions and methods described herein. For example, in some embodiments, the treatment fluids may be foamed by injection of a gas therein, wherein a co-surfactant (such as a cocobetaine) is included in treatment fluids to facilitate the formation of and/or stabilize the foam. In some embodiments, the co-surfactant may act to at least partially stabilize the treatment fluid. Generally, the co-surfactants may be present an amount sufficient to optimize the performance of the treatment fluid in a particular application, as determined by one of ordinary skill in the art. In one embodiment, for example, where the co-surfactant is included to increase salt tolerability or to stabilize the treatment fluids of the present invention, the co-surfactant may be present in a co-surfactant-to-surfactant weight ratio in the range of from about 1:100 to about 100:1. This ratio is very surfactant and application dependent as recognized by one skilled in the art.

The treatment fluids of the present invention may further comprise particulates (such as proppant particulates or gravel particulates) suitable for use in subterranean applications. Particulates suitable for use in the present invention may comprise any material suitable for use in subterranean operations. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, 50/70, or 71/140 mesh. Also suitable is 100 mesh sand often referred to as Oklahoma #1. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of the present invention may be coated with any suitable resin or tackifying agent known to those of ordinary skill in the art.

In some embodiments, the treatment fluids of the present invention may comprise a viscosifier. A variety of viscosifiers may be included in the fluids of the present invention. Examples of suitable viscosifiers include, inter alia, biopolymers such as xanthan and succinoglycan, cellulose derivatives such as hydroxyethylcellulose, and guar and its derivatives such as hydroxypropyl guar. Other suitable examples include diutan and scleroglucan. Combinations and derivatives of these are suitable as well. If used, the viscosifier may be present in the drill-in fluids of the present invention in an amount sufficient to provide the desired degree of viscosity. In some embodiments, the viscosifier may be present in the fluids of the present invention in an amount in the range of from about 0.01% to about 10% by weight.

The treatment fluids of the present invention may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range that may help form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the present invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

The treatment fluids of the present invention may optionally comprise additional additives, including, but not limited to, acids, fluid loss control additives, gas, corrosion inhibitors, scale inhibitors, catalysts, clay control agents, biocides, hydrate inhibitors, breakers (e.g., enzymes, oxidizers, etc.), other surfactants, foamers, emulsifiers, nonemulsifiers/demulsifiers, oxidizers, reducers, friction reducers, combinations thereof and the like. For example, in some embodiments, it may be desired to foam a treatment fluid of the present invention using a gas, such as air, nitrogen, or carbon dioxide. In another embodiment, it may be desired to include an acid in the treatment fluid. In one certain embodiment, the treatment fluids of the present invention may contain a particulate additive, such as a particulate scale inhibitor. Individuals skilled in the art, with the benefit of this disclosure, will recognize the types of additives that may be necessary for inclusion in the treatment fluids of the present invention for a particular application.

The treatment fluids of the present invention may be prepared by any suitable method. In some embodiments, the treatment fluids may be prepared on the job site. As an example of such an on-site method, a surfactant may be combined with an aqueous base fluid, a surfactant-based fluid loss control agent of the present invention, and one or more salts. In some embodiments, the one or more salts may be combined with the aqueous base fluid prior to their combination with the surfactant and the surfactant-based fluid loss control agents. In one certain embodiment, an additive for adjusting and/or maintaining pH may be combined with the aqueous base fluid, among other things, to provide or maintain a desired ionic strength. The additive for maintaining and/or adjusting pH may be combined with the aqueous base fluid either prior to, after, or simultaneously with the surfactant. Furthermore, additional additives, as discussed above, may be combined with the treatment fluid and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid, the surfactant may be combined with a surfactant solubilizer prior to its combination with the other components of the treatment fluid. The surfactant solubilizer may be any suitable surfactant solubilizer, such as water, simple alcohols, and combinations thereof. For example, in some embodiments, the surfactant may be provided in a mixture that comprises the surfactant solubilizer and the surfactant. One or ordinary skill in the art, with the benefit of this disclosure, will be able to determine other suitable methods for preparation of the treatment fluids.

As previously discussed, at certain conditions, the surfactant molecules present in the treatment fluids may associate to form the desired micelles, which, depending on a number of factors (e.g., MES surfactant concentration), may viscosity the fluid so that it exhibits viscoelastic behavior such as in a surfactant gel. The micelles present in the treatment fluids of the present invention are generally sensitive to, among other things, the ionic strength of the fluid, hydrocarbons, and shear stress. Further, they also may be sensitive to temperature. Accordingly, these treatment fluids containing the desired micelles may experience a viscosity decline after introduction into the well bore and/or penetration into the subterranean formation, without the need for external gel breakers. As previously discussed, this viscosity reduction is generally due to the dissociation and/or modification of the micellar structure. For example, in hydrocarbon-containing portions of the subterranean formation, the viscosity of the treatment fluids may be reduced by contact with the hydrocarbons contained therein. Likewise, in certain portions of the subterranean formation (e.g., carbonate formations), the treatment fluids may experience a pH change, thereby facilitating a change in the ionic strength of the fluid. In certain embodiments, dilution of the treatment fluid may also facilitate a reduction in viscosity of the treatment fluid. For example, the treatment fluid may be diluted by contact with formation fluids and/or subsequently injected treatment fluids, thereby reducing the concentration of the desired micelles in the treatment fluid and/or changing the ionic strength of the treatment fluid.

In alternative embodiments, if used at a concentration sufficient to provide a higher level of viscosity to the treatment fluid, the surfactant-based fluid loss control agents of the present invention should be present in a treatment fluid of the present invention in an amount sufficient to provide the desired viscosity (e.g., sufficient for particulate transport, etc.) therein through formation of the desired micelles. In certain embodiments, the surfactant-based fluid loss control agents of the present invention may be present in the fluids in an amount of from about 0.5% to about 15% by weight of water ("bwow"). In certain exemplary embodiments, the surfactant-based fluid loss control agents of the present invention may be present in the treatment fluids of the present invention in an amount of from about 0.5% to about 5% bwow.

The treatment fluids may be used for carrying out a variety of subterranean treatments, where a viscosified treatment fluid may be used, including, but not limited to, drilling operations, fracturing treatments, acidizing treatments, and completion operations (e.g., gravel packing). In some embodiments, the treatment fluids of the present invention may be used in treating a portion of a subterranean formation.

In certain embodiments, a treatment fluid that comprises an aqueous base fluid, a surfactant, and surfactant-based fluid loss control agents of the present invention may be introduced into a well bore that penetrates the subterranean formation. In some instances, the treatment fluid exhibits viscoelastic behavior which may be due, at least in part, to the association of at least a portion of the surfactant-based fluid loss control agents into a plurality of micellar structures. Optionally, the treatment fluid further may comprise particulates and other additives suitable for treating the subterranean formation. As previously mentioned, the treatment fluid generally may experience a reduction in viscosity after placement into the well bore. For example, the treatment fluid may be allowed to contact the subterranean formation for a period of time sufficient to reduce the viscosity of the treatment fluid. In some embodiments, the treatment fluid may be allowed to contact hydrocarbons, formations fluids, and/or subsequently injected treatment fluids, thereby reducing the viscosity of the treatment fluid. After a chosen time, the treatment fluid may be recovered through the well bore.

In certain embodiments, the treatment fluids may be used in fracturing treatments. In the fracturing embodiments, a treatment fluid that comprises an aqueous base fluid, a MES surfactant, and surfactant-based fluid loss control agents of the present invention may be introduced into a well bore that penetrates a subterranean formation at or above a pressure sufficient to create or enhance one or more fractures in a portion of the subterranean formation. Generally, in the fracturing embodiments, the treatment fluid may exhibit viscoelastic behavior which may be due, at least in part, to the association of at least a portion of the surfactant-based fluid loss control agents into a plurality of micellar structures. Optionally, the treatment fluid further may comprise particulates and other additives suitable for the fracturing treatment.

As previously mentioned, the treatment fluid generally may experience a reduction in viscosity after introduction into the subterranean formation. After a chosen time, the treatment fluid may be recovered through the well bore.

In certain embodiments, the treatment fluids of the present invention may be used for providing some degree of sand control in a portion of the subterranean formation. In the sand control embodiments, a treatment fluid that comprises an aqueous base fluid, particulates, a surfactant, and surfactant-based fluid loss control agents of the present invention may be introduced into a well bore that penetrates the subterranean formation such that the particulates form a gravel pack in or adjacent to a portion of the subterranean formation. Generally, in the sand control embodiments, the treatment fluid may exhibit viscoelastic behavior which may be due, at least in part, to the association of at least a portion of the surfactant-based fluid loss control agents into a plurality of micellar structures. Optionally, the treatment fluid further may comprise other additives suitable for the sand control treatment. In some embodiments, the portion in which some degree of sand control is provided is the same portion of the subterranean formation as the portion that the gravel pack is formed in or adjacent to. As previously mentioned, the treatment fluid generally may experience a reduction in viscosity after introduction into the well bore. Furthermore, any portion of the treatment fluid that leaks off into the formation during the sand control treatment may also experience a reduction in viscosity. After a chosen time, the treatment fluid may be recovered from the well bore.

To facilitate a better understanding of the present invention, the following examples of preferred embodiments are given. In no way should the following examples be read to limit, or define, the scope of the invention.

EXAMPLES

Fluid loss experiments were conducted with a static fluid loss cell where the vessel temperature and pressure could be controlled more easily. Cylindrical cores were drilled from a sandstone stock and cut to dimensions of approximately one inch in length and one inch in diameter. The curved sides of the cylindrical cores were sealed with an epoxy resin so that test fluid could pass through the two flat surfaces on either end of the cylindrical core. These cores were saturated with 2% KCl in water by submerging the cores in a large volume of 2% KCl in water and applying a vacuum to pull the air from the cores. The permeability of the cores was then measured using 2% KCl in water. Once the core properties were measured, fluid loss studies were performed on two viscoelastic surfactant fluids.

The viscoelastic surfactant fluids were identical except that one sample contained a solid fluid loss agent. The base viscoelastic fluid is 5 gal/Mgal Miratiane BET-30, 1.5 gal/Mgal NaOH solution (40% in water) in 2% by weight KCl in water. This solid fluid loss agent is methyl ester sulfonate which may also form a viscoelastic surfactant once it goes into solution. The core properties and the test fluids are listed in Table 1 below. The fluid loss data are illustrated in FIG. 1.

TABLE 1

| Core | Length (in) | Diameter (in) | Measured Permeability (md) | Temperature (° F.) | Pressure Drop across Core (psi) | Fluid |
|------|-------------|---------------|----------------------------|--------------------|---------------------------------|-------|
| 9B | 1.04 | 0.908 | 46.9 | 97 | 521 | VES |
| 9C | 1.02 | 0.871 | 45.3 | 97 | 526 | VES with 1% MES |

It was observed that by adding 1% methyl ester sulfonate to the viscoelastic surfactant fluid, fluid loss through the core is suppressed. In this particular experiment at the experimental temperature, the methyl ester sulfonate remained mostly in solid form suspended in the viscoelastic surfactant fluid. When the core was removed after the experiment, the solid methyl ester sulfonate was packed at the core face adding resistance to fluid loss.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing a treatment fluid comprising:
      an aqueous base fluid,
      a first surfactant, and
      a surfactant-based fluid loss control agent capable of forming a viscoelastic fluid, wherein the surfactant-based fluid loss control agent comprises at least one viscoelastic gel forming surfactant selected from the group consisting of: a methyl ester sulfonate, a taurate, a behenyl quat, behenyl trimethyl ammonium chloride, and any derivative thereof; and
   introducing the treatment fluid into a well bore that penetrates the subterranean formation.

2. The method of claim 1 wherein the treatment fluid is introduced into the well bore as part of a fracturing, acidizing, gravel packing, drilling, plugging, or a fluid loss control operation.

3. The method of claim 1 wherein the treatment fluid exhibits viscoelastic behavior due, at least in part, to the association of at least a portion of the surfactant into a plurality of micellar associations.

4. The method of claim 1 wherein the concentration of the first surfactant in the treatment fluid is about zero.

5. The method of claim 1 wherein the treatment fluid comprises at least one water-soluble salt or at least one anion.

6. The method of claim 1 wherein the surfactant-based fluid loss control agent comprises the taurate, wherein the taurate is chosen from the group consisting of: water-soluble substituted taurines; N-acyl N-methyl taurates; N-cetyl N-methyl taurate; N-erucyl N-methyl taurate; N-oleoyl N-methyl taurate; N-cocoyl N-methyl taurate; N-tallowyl N-methyl taurate; N-tallyl N-methyl taurate; N-soyayl N-methyl taurate; N-rapeseedyl N-methyl taurate; N-acyl taurates; N-erucyl taurate; N-oleoyl taurate; N-cocoyl taurate; N-tallowyl taurate; N-tallyl taurate; N-soyayl taurate; N-rapeseedyl taurate; and
   combinations and derivatives thereof.

7. The method of claim 1 wherein the surfactant-based fluid loss control agent comprises the methyl ester sulfonate, wherein the methyl ester sulfonate is described by the following formula:

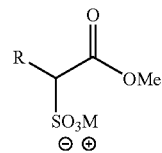

Formula I where R is an alkyl chain of from about 10 carbon atoms to about 30 carbon atoms.

8. The method of claim 1 wherein the first surfactant is a cationic, anionic, or amphoteric surfactant.

9. The method of claim 1 wherein the first surfactant comprises a surfactant chosen from the group consisting of: betaines; modified betaines; sulfosuccinates;
   taurates; amine oxides; ethoxylated fatty amines; quaternary ammonium compounds; and
   combinations or derivatives thereof.

10. The method of claim 1 wherein the treatment fluid is foamed or commingled with a gas.

11. The method of claim 1 wherein the treatment fluid further comprises an additive selected from the group consisting of: co-surfactants; particulates; pH adjusting agents; acids, fluid loss control additives; gases; corrosion inhibitors; scale inhibitors; catalysts; clay control agents; biocides; hydrate inhibitors; breakers; foamers; emulsifiers; nonemulsifiers;
   demulsifiers; oxidizers; reducers; friction reducers; particulate scale inhibitors; surfactant solubilizers; and combinations thereof.

12. The method of claim 1 wherein the treatment fluid is prepared on the job site.

13. The method of claim 1 wherein the treatment fluid comprises a viscosifier.

14. The method of claim 1 wherein the viscoelastic gel forming surfactant comprises a powdered or solid surfactant.

15. A method of providing fluid loss to a surfactant gel comprising adding a surfactant-based fluid loss control agent capable of forming a viscoelastic fluid to the surfactant gel, wherein the surfactant-based fluid loss control agent comprises at least one powdered or solid viscoelastic gel forming surfactant selected from the group consisting of: a methyl ester sulfonate, a taurate, a behenyl quat, behenyl trimethyl ammonium chloride, and any derivative thereof.

16. The method of claim 15 wherein the surfactant-based fluid loss control agents are included in an amount of from about 0.0 1% to about 30% based on the weight of the surfactant gel.

17. The method of claim 15 further comprising introducing the surfactant gel into a subterranean formation.

18. A method of fracturing a subterranean formation comprising:
   providing a treatment fluid, the treatment fluid comprising:
      an aqueous base fluid;
      a first surfactant; and
      a surfactant-based fluid loss control agent capable of forming a viscoelastic fluid, wherein the surfactant-based fluid loss control agent comprises at least one powdered or solid viscoelastic gel forming surfactant selected from the group consisting of: a methyl ester sulfonate, a taurate, a behenyl quat, behenyl trimethyl ammonium chloride, and any derivative thereof; and introducing the treatment fluid into a well bore that penetrates the subterranean formation at or above a pressure sufficient to create or enhance one or more fractures in a portion of the subterranean formation.

19. The method of claim 18 wherein the concentration of the first surfactant in the treatment fluid is about zero.

20. A method comprising:
providing a treatment fluid comprising:
an aqueous base fluid, and
a surfactant-based fluid loss control agent capable of forming a viscoelastic fluid, wherein the surfactant-based fluid loss control agent comprises at least one powdered or solid viscoelastic gel forming surfactant selected from the group consisting of: a methyl ester sulfonate, a taurate, a behenyl quat, behenyl trimethyl ammonium chloride, and any derivative thereof; and introducing the treatment fluid into a well bore that penetrates the subterranean formation.

21. The method of claim 20 wherein the treatment fluid comprises a viscosifier.

22. A method comprising:
providing a treatment fluid that comprises an aqueous base fluid, particulates, a first surfactant, and a surfactant-based fluid loss control agent capable of forming a viscoelastic fluid, wherein the surfactant-based fluid loss control agent comprises at least one powdered or solid viscoelastic gel forming surfactant selected from the group consisting of: a methyl ester sulfonate, a taurate, a behenyl quat, behenyl trimethyl ammonium chloride, and any derivative thereof;

introducing the treatment fluid into a well bore that penetrates a subterranean formation such that the particulates form a gravel pack in or adjacent to a portion of the subterranean formation.

* * * * *